United States Patent [19]

Davidson, Jr. et al.

[11] Patent Number: 5,550,957
[45] Date of Patent: Aug. 27, 1996

[54] MULTIPLE VIRTUAL PRINTER NETWORK INTERFACE

[75] Inventors: Peter S. Davidson, Jr.; Francis D. Rafferty, Jr.; Gail M. Songer, all of Lexington, Ky.

[73] Assignee: Lexmark International, Inc., Greenwich, Conn.

[21] Appl. No.: 350,860

[22] Filed: Dec. 7, 1994

[51] Int. Cl.⁶ .................................................... G06F 15/00
[52] U.S. Cl. .......................................... 395/114; 395/112
[58] Field of Search .................................... 395/112, 114, 395/200, 325, 800, 101, 109, 110; 370/85.8

[56] References Cited

U.S. PATENT DOCUMENTS

| | | | |
|---|---|---|---|
| 5,084,875 | 1/1992 | Weinberger et al. | 371/29.1 |
| 5,164,842 | 11/1992 | Gauronski et al. | 358/401 |
| 5,214,772 | 5/1993 | Weinberger et al. | 395/575 |
| 5,220,566 | 6/1993 | Ikenove | 395/200 |
| 5,220,674 | 6/1993 | Morgan et al. | 395/800 |
| 5,226,112 | 7/1993 | Mensing et al. | 395/114 |
| 5,247,623 | 9/1993 | Sun | 395/325 |
| 5,271,065 | 12/1993 | Rourke et al. | 382/1 |
| 5,303,336 | 4/1994 | Kageyama et al. | 395/114 |
| 5,323,393 | 6/1994 | Barrett et al. | 370/85.8 |
| 5,333,286 | 7/1994 | Weinberger et al. | 395/575 |
| 5,353,388 | 10/1994 | Motoyama | 395/117 |
| 5,361,265 | 11/1994 | Weinberger et al. | 371/29.1 |
| 5,371,837 | 12/1994 | Kimber et al. | 395/114 |
| 5,438,528 | 8/1995 | Emerson et al. | 364/580 |

OTHER PUBLICATIONS

HP JetDirect Network Interface Configuration Guide, Hewlett–Packard Manual Part No. J2371–90001, 1993, pp. iv–ix and Section 2 Software Installation and Configuration for Novell Netware Networks, pp. 2–2 through 2–18.

HP JetDirect Ex External Network Interface Configuration Guide, Hewlett–Packard Manual Part No. J2382–90101, 1993, pp. 7–12 and Section 2 Novell Netware Networks, pp. 2–2 through 2–36.

Lexmark WinWriter 600 User's Reference, Manual No. SA40–0779–00, 1993, Chapter 2 Using the Windows Printing System, pp. 11–26 and Chapter 3 Checking Print Status, pp. 27–39.

Standard Signaling Method for a Bi–directional Parallel Peripheral Interface for Personal Computers, IEEE P 1284 D2.00, Sep. 10, 1993, Institute of Electrical and Electronic Engineers, pp. 1–119.

Network Printing Alliance Protocol, A Printer/Host Control Specification, Level 1, Revision N, Feb. 11, 1994, Developed By The Network Printing Alliance.

*Primary Examiner*—Mark R. Powell
*Assistant Examiner*—Dov Popovici
*Attorney, Agent, or Firm*—John J. McArdle, Jr.; Ronald K. Aust

[57] ABSTRACT

Multiple host computers on a network are connected through an interface, or network adapter, to a printer having a printer controller capable of bi-directional communication with the computers on the network. The interface communicates with the network computers in a manner to present a different virtual printer to each host computer. The interface maintains a data set for each host computer which includes designations of the types of printer status information of interest to that host. The interface is capable of communicating with the printer controller to obtain a range of printer status information, and the interface communicates with each host computer to present printer status information of interest to that computer based upon that computer's data set. In the disclosed form of the invention, the interface notifies each interested host computer concerning types of printer status information to which changes have occurred; and the host computers communicate requests for more detailed information. This more detailed information is then obtained from the printer controller and provided to the interested host computers by the interface.

7 Claims, 5 Drawing Sheets

MULTIPLE VIRTUAL PRINTER NETWORK INTERFACE

BACKGROUND OF THE INVENTION

This invention relates to interfaces between networked host computers and one or more printers serving the network. The invention is disclosed particularly in relation to a network adapter circuit having a first physical connection to a computer network and a second physical connection to a printer controller.

A communication interface, between a computer network and a printer for printing print jobs for computers on the network, is usually provided by a network adapter (hardware and software) located on a circuit card internal to the printer or supplied as an external device. The network adapter is programmed to send and receive information using the network operating system, for example to obtain print job data and control commands. The network adapter in turn is capable of communicating with the printer controller to effect printing of the print jobs received from the host computers on the network.

In accordance with an embodiment of the invention to be described herein, an internal network adapter is contained in a laser printer, permitting direct connection to a local area network without using a dedicated print server (computer) on the network. The illustrated internal network adapter is in bi-directional communication with host computers on the network. In the described embodiment of the invention, this bi-directional communication is in accordance with a protocol known as the Network Printer Alliance Protocol. The published Network Printer Alliance Protocol (NPAP) defines a bi-directional means of communication between one host computer and one printer. The NPAP provides a means of returning printer status information to a host computer. Status information from a printer and queries from a host computer for status information conforming to the NPAP are communicated, as well as print job data and commands contained within NPAP "wrappers". In the present system, multiple host computers are connected over a network to a network adapter for a single printer, and printer status messages and inquiries are handled by the network adapter and each host computer separately from the processing of print job data. This permits asynchronous communication between the printer and each host utilizing the printer regardless of a "busy" condition at the printer while the printer is receiving print jobs. Sending each printer status message to each NPAP-compatible host computer on the network creates a large amount of network traffic, degrading network communication efficiency.

It is the aim of the invention to enhance the bi-directional communication in network printing systems of the foregoing type to allow multiple host computers to efficiently communicate with a single printer. In accordance with the embodiment of the invention disclosed hereinafter, this objective is accomplished by having the internal network adapter for the printer present multiple virtual printers conforming to the NPA Protocol to the multiple hosts on the network. This is accomplished by storing and utilizing particular NPAP data for each host on the network that wishes to communicate with the printer using the NPA Protocol.

In the illustrated form of the invention, the printer controller issues Device Status Alerts (DSA's) to the network adapter concerning problems or potential problems in performing printing. The printer controller also communicates printer operator panel changes and print job alerts to the network adapter. When one of these asynchronous events occurs at the printer, a message is sent, utilizing the NPAP, from the printer to the network adapter. The network adapter then consults sets of data stored for each host computer on the network which is in NPAP-compliant bi-directional communication with the adapter (and printer). The network adapter uses this data to determine which host computers wish to receive the printer information contained in the message. The network adapter then sends the printer information to only those host computers which have requested it.

In the form of the invention described herein, the foregoing printer information is indicative of a class or category of printer information.

After receiving this general information, a host computer can request the detailed information of exactly what type of asynchronous event has occurred. The detailed information requested by an interested host computer, and obtained from the printer by the network adapter, is then sent to the requesting host.

DETAILED DESCRIPTION

Figure 1:
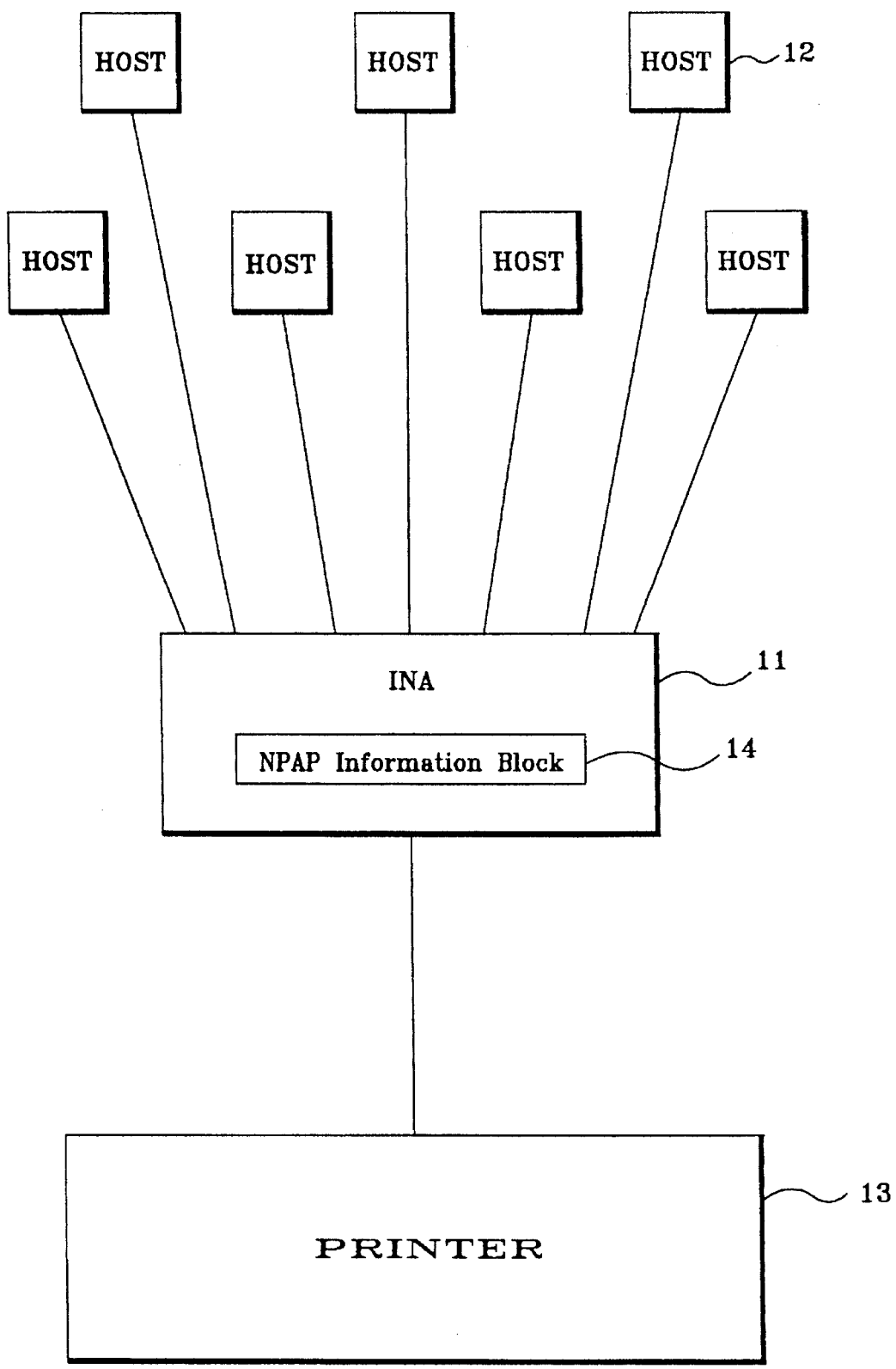
FIG. 1 is a diagrammatic view of multiple host computers connected through an internal network adapter to a printer.

With reference to FIG. 1, an exemplary interface between multiple host computers and a single printer is an internal network adapter (INA) 11 located within the printer housing. The INA 11 is connected to a number of host computers such as 12 on a network. The connection of the host computers such as 12 to the INA 11 is diagrammatic in that there would typically be a single network connection to the adapter 11 from, for example, a token ring or ethernet network hardware platform.

The adapter 11 is also connected to the normal controller for a print engine (shown in combination as printer 13), as shall be described in more detail hereinafter. In accordance with an aspect of the invention, the INA 11 includes in memory a Network Printing Alliance Protocol (NPAP) information block 14, which has a set of data for each suitably bi-directionally connected host computer. Each set of data includes designations of types of printer status information of interest to each such host.

Figure 2:
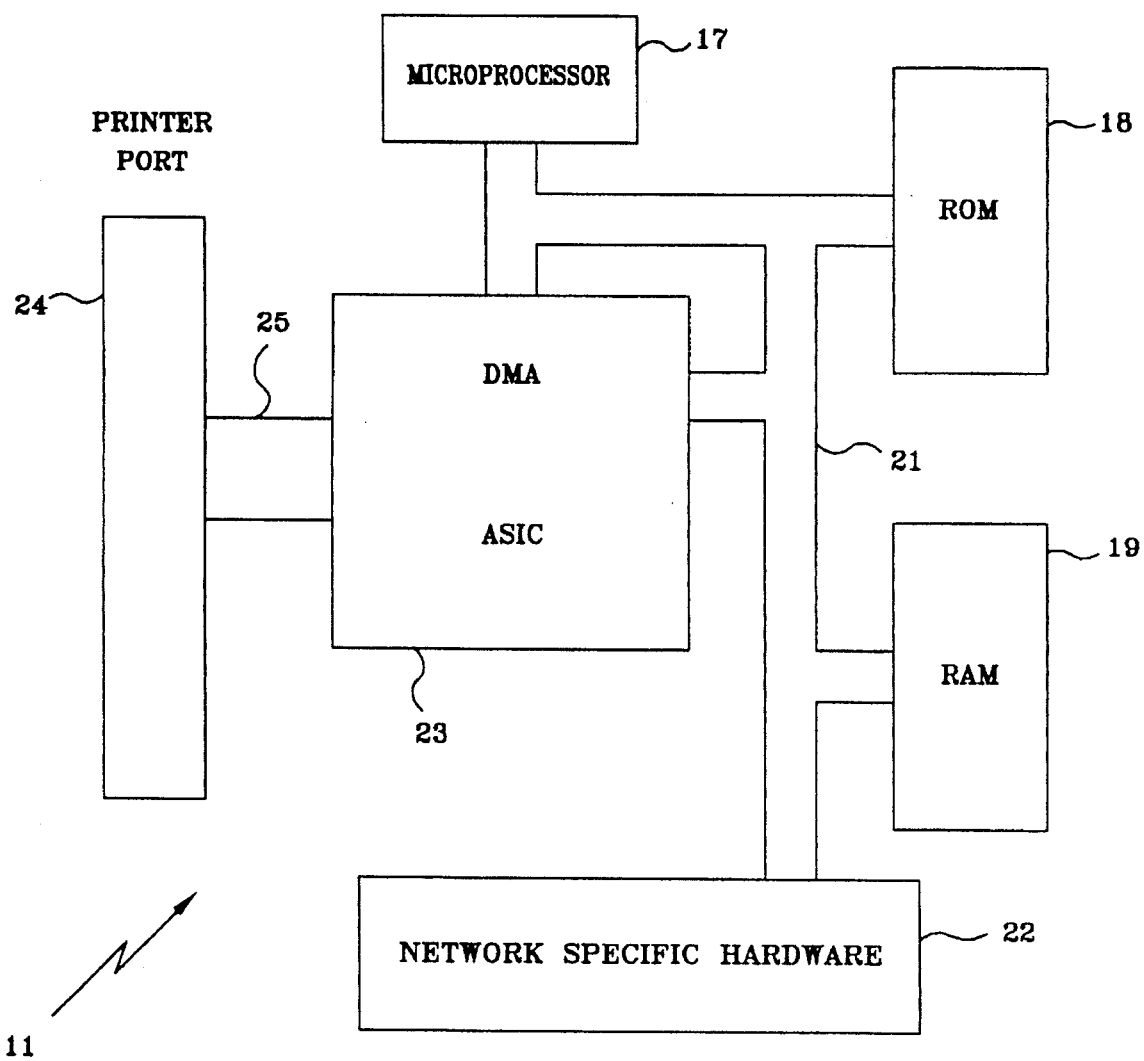
FIG. 2 is a block diagram of the internal network adapter of FIG. 1.

Turning now to FIG. 2, the internal network adapter 11 includes a microprocessor 17 and associated read only memory (ROM) 18 and random access memory (RAM) 19, accessible to the microprocessor on a bus 21. In the present form of adapter, the microprocessor 17 is an Intel 80186 microprocessor; and host data received at a network specific hardware interface 22 is transferred by a direct memory access (DMA) controller ASIC 23 into the RAM 19. The DMA operation may be controlled by the microprocessor 17 or by the network specific hardware 22, dependent upon the network hardware platform to which the INA 11 is attached. Data read from the network specific hardware 22 into the RAM 19 is subsequently transferred across a printer port 24 by the DMA controller ASIC 23.

In the illustrated system, the network operating system is Novell Netware 2.2 or 3.11 or later. As shall be described subsequently, the host computers operating on the Novell Operating System network are set up to send NPAP-compliant data and commands to a particular "socket", or logical address, of the network specific hardware 22. Therefore, non-NPAP information, received at a different socket, can be transferred to the printer port 24 without processing in the manner that NPAP data is processed by the microprocessor 17. The NPAP information is processed by the microprocessor 17 in accordance with the present invention, as shall be described subsequently.

To communicate data to the printer port 24, the data is presented on the lines of a bus 25 in accordance with, one mode of a number of modes of communication. Exchanges of commands between the printer and the INA place the port 24 into data mode, menu mode, NPAP status mode or Device Status Alert (DSA) mode. In data mode data is transferred across the printer port 24 to provide page information for print jobs. In menu mode, printer operator panel information is transferred across the printer port 24 from the printer controller to the INA. In NPAP status mode, NPAP-compliant commands are sent from the INA to the printer controller over the printer port 24, with the port remaining in NPAP status mode until an appropriate response is received from the printer controller. In setting DSA mode, the INA responds to a request from the printer controller to be allowed to send a status alert. To do this the INA sets the printer port into DSA mode so that the printer can send the Device Status Alert to the INA.

Figure 3:
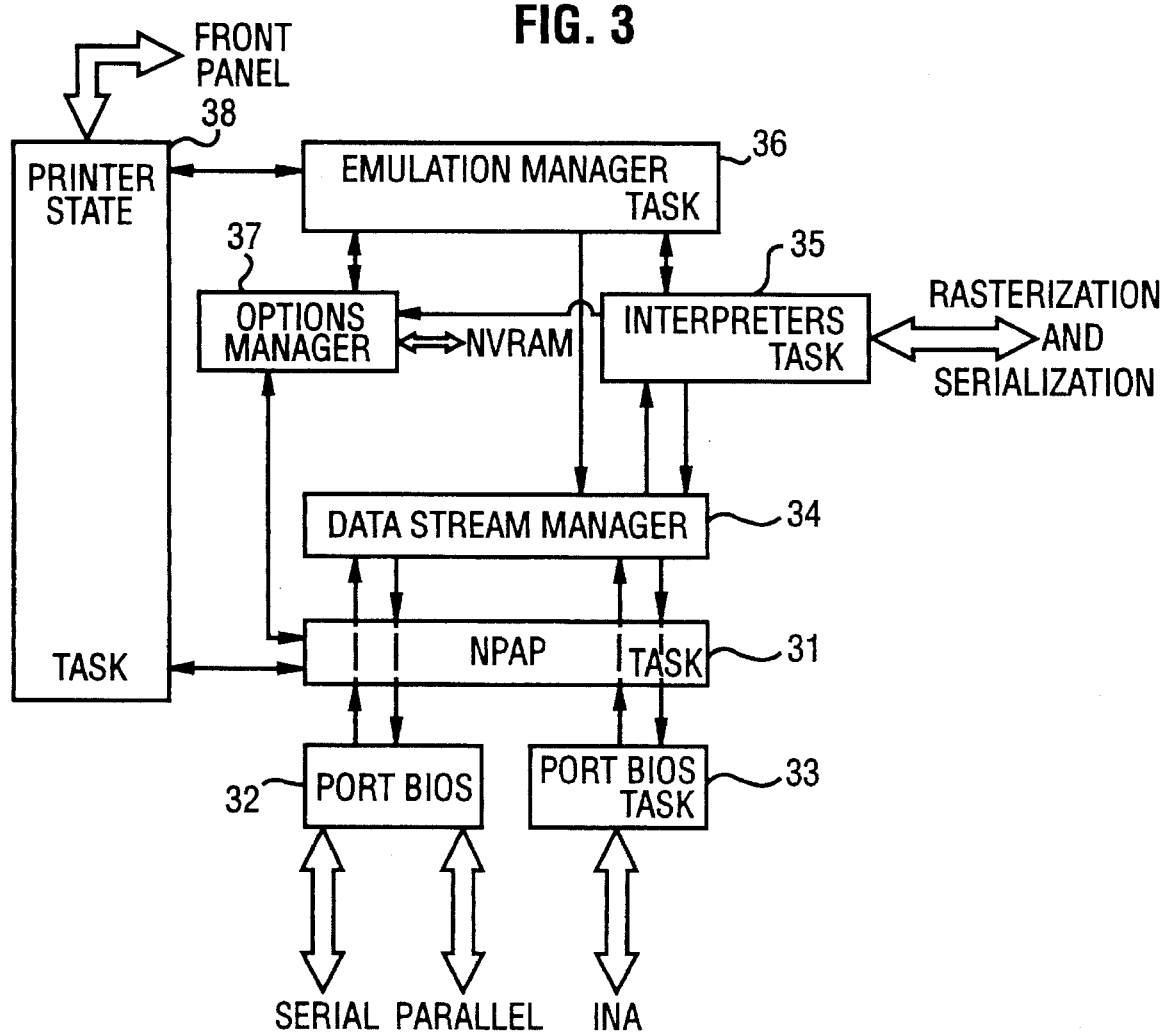
FIG. 3 is a functional block diagram of a controller for the printer of FIG. 1 as relevant to the present invention.

With reference now to FIG. 3, a laser printer for use with the present invention includes a printer controller, the relevant portions of which are shown functionally. The microprocessor-based controller performs functions which include a number of tasks, the relevant ones of which are indicated in the figure, and a number of libraries of code which may be called by the tasks to perform various functions. The tasks are activated by timer counts or interrupts to perform functions, as shall be described.

The exemplary printer controller is capable of effecting the usual printer functions such as maintaining a control panel, interpreting incoming print jobs received in one or more printer control languages, and rasterizing and serializing the interpreted data to drive a laser printer engine. The exemplary controller includes the ability to communicate through serial, parallel and network ports bi-directionally using NPAP. The principal task for handling NPAP-compliant commands and data is the NPAP Task 31.

The NPAP Task 31 performs the functions of handling commands and data in the NPAP (Network Printing Alliance Protocol) format. The NPAP Task supplies printer status information to direct attached and network attached host computers and receives requests for such information from the host computers. The NPAP Task 31 is activated periodically by a timer, and when it is activated the NPAP Task calls the Port BIOS 32 for the serial and parallel ports and the Port BIOS 33 for the INA port to determine if there is received data at one or more of the ports. If an NPA command is received, the NPAP Task 31 responds through the appropriate port either directly or after obtaining needed information from another function in the printer controller. Before describing operation of the NPAP Task in more detail, its state as being "on" or "off" will be described.

The NPAP Task may be "on", "off" or "auto" for each port, serial, parallel or INA. If the NPAP Task is off, print data is directly provided from the Port BIOS 32 or 33 to the Data Stream Manager, as shall be described. If the NPAP Task is on, then only data in NPAP format will be passed through (after removal of NPA wrappers) to the Data Stream Manager, with other inputs being rejected. If the NPAP Task is in auto mode, the NPAP Task is on until non-NPAP data (or commands) are received. Then the NPAP Task is off, and non-NPAP data is passed through to the Data Stream Manager. The NPAP Task remains in pass through mode until a reset command is received or a print job boundary is encountered (over the INA port).

When none of the interpreters 35 are running to provide data for subsequent rasterization and serialization in the printer, the Emulation Manager Task 36 looks for print data at a port to direct to the appropriate interpreter. In the absence of the NPAP Task 31, the Emulation Manager 36 calls Data Stream Manager 34 functions to transfer print data from the Port BIOS 32 or 33 to a buffer. If the NPAP Task is on for a particular port, the Data Stream Manager 34 accesses data from an NPAP Task buffer for that port. The Emulation Manager and Data Stream Manager also cooperate to associate a "job structure" with each print job received at a port. The job structure includes an identification number for the print job, an area to record the number of pages which have been printed, and information on resolution and other specifics. The job structure data is also capable of being modified during the printing process to update the status of the job.

The Emulation Manager 36 also cooperates with the Data Stream Manager 34 to route each print job to the appropriate interpreter (such as a PostScript or a PCL interpreter) for that print job. The Data Stream Manager passes the print job data in the appropriate language to the selected interpreter until the end of the job, when the Data Stream Manager provides an end-of-job condition to the interpreter. When the interpreter is finished with the print job, it indicates this to the Emulation Manager Task. This is one of the occasions upon which the job structure data can be modified if desired. As each page is rendered, the page is provided to graphics engine software and print mechanism hardware for eventual rasterization of the pages to be printed and serialization of the bit map information to the print mechanism.

The Options. Manager Library 37 provides a high level interface through NVRAM BIOS to non-volatile RAM in the printer. Options Manager 37 is used by the Emulation Manager Task 36 and the interpreters in creating job structure information where such information is derived from NVRAM values. The NPAP Task 31 also can communicate with the Options Manager 37 to read and write NVRAM settings.

The Printer State Task 38 first learns of outside (to the controller code) events occurring in the printer. The Printer State Task 38 notes, for example, if the printer cover has been opened and orchestrates providing this information to the front panel and to any other users of such information such as the NPAP Task 31. The Printer State Task will become aware of certain conditions due to hardware interrupts to the processor, while other status information is checked by the Printer State Task 38 on a polling basis. Printer configuration changes, Device Status Alerts, and changes to the printer front panel are passed from the Printer State Task 38 to the NPAP Task 31 for communication to attached host computers.

Figure 4:
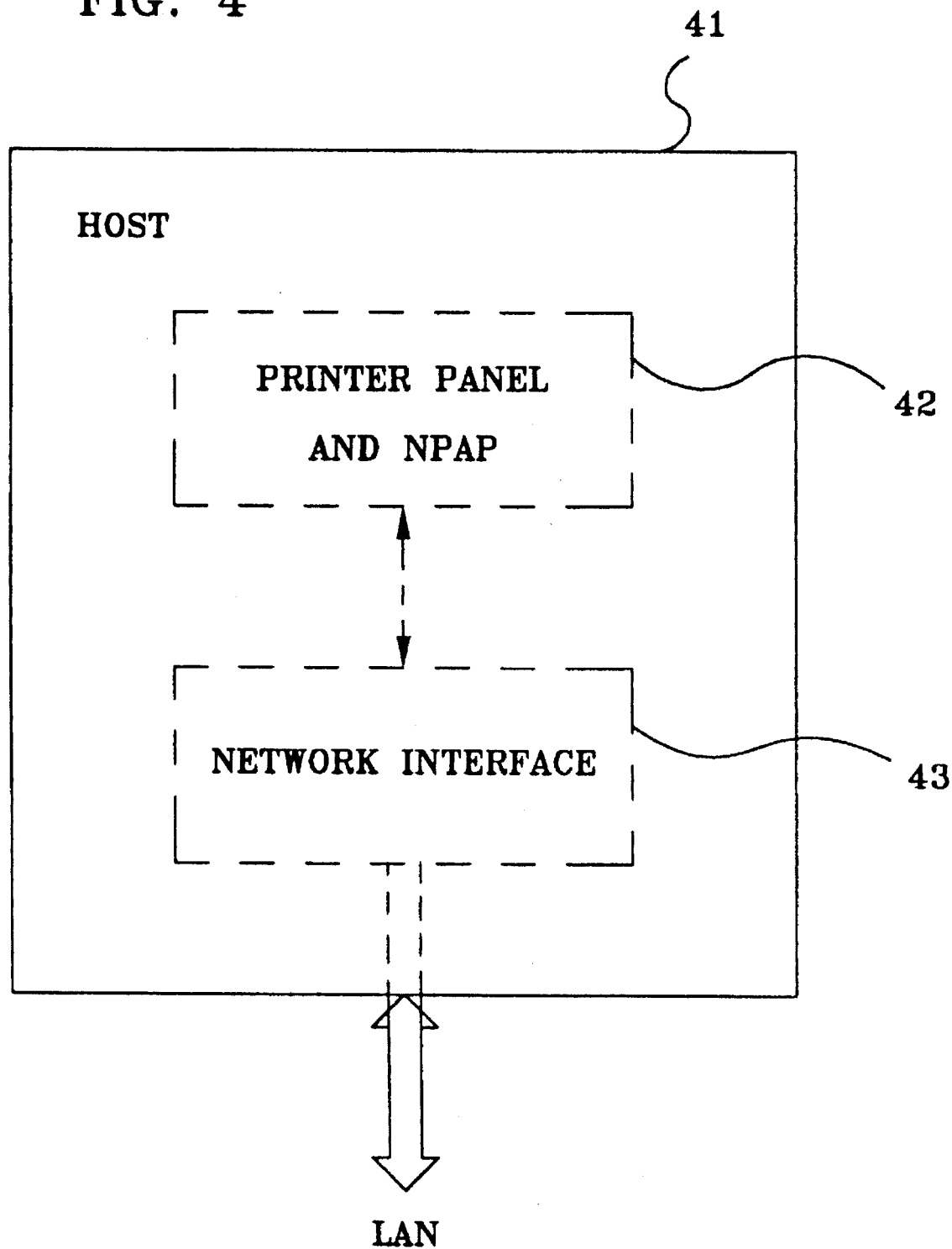
FIG. 4 is a functional block diagram of the host computer operation as relevant to the present invention.

With reference to FIG. 4, an exemplary host computer 41 is shown connected to a local area network (LAN) and functionally comprising certain software functions relevant to the present invention. The host computer 41 typically includes memory and storage devices such as disk drives (not shown) and associated peripheral devices (not shown) as in typical IBM-compatible personal computers. For the purposes of the present invention, the host computer 41 includes Printer Panel and NPAP code 42, which cooperates with Network Interface code 43, to perform bi-directional communication with printers on a local area network and to display printer status information to a user on a display associated with the host computer 41. The Printer Panel and NPAP code 42 permits a user of the host computer to remotely control printers on an attached local area network and to receive status and fault information from the printers. In the illustrated form, the host computer 41 includes an Intel 80X86 microprocessor (80386 or higher) running Microsoft Windows 3.1 and a suitable version of Microsoft DOS for Microsoft Windows 3.1. In this system the Printer Panel and NPAP code 42 runs within the Windows operating environment.

The Printer Panel and NPAP code 42 operates to display user information such as printer status, printer operator panel displays, and printer configuration information. When a user wishes to "press" a printer operator panel key, the user utilizes a remote operator panel display at the host, such as by clicking on a representation of a key in the displayed operator panel.

The code 42 utilizes the Network Printing Alliance Protocol (NPAP) to communicate bi-directionally with available printers on the attached local area network. For a locally attached printer, the printer panel and NPAP code 42 interfaces with a local printer driver, which can handle one or more locally attached printers. For present purposes, the communication of interest is with printers on the local area network. The Printer Panel and NPAP code 42 interfaces with the network interface code 43, which is unique to the particular network protocol employed. In the present instance, the network interface code 43 is for a Novell network and the local area network employed is a Novell network.

The network interface code 43 serves to encapsulate within the Novell Netware protocols the items of information communicated to and from printers on the network, including commands for communicating in a bi-directional way (using NPAP) with printers on the local area network. The network interface code 43 can support one or more printers simultaneously, thereby virtualizing one printer at a time for the host software applications or drivers operating through the network interface code 43 to access each printer on the network.

Architecturally, although not essential to the present invention, in a preferred form, the Printer Panel and NPAP code 42 is implemented in two separate sections, Printer Panel and NPAP. In this way the Printer Panel functions can make calls in protocol-independent form; and separate protocol code, such as for NPAP, can convert those general function calls. This permits the code interfacing with the user to remain independent of the bi-directional protocol such as NPAP used for bi-directional communication with the printers. The Printer Panel and NPAP code 42 is therefore, as illustrated, also independent of the network environments through which printers are made available.

With the host computer 41 operating in the Windows environment, the Network Interface code 43 serves to route information between the Printer Panel and NPAP code 42 and NPAP-compliant printers on the local area network. Communication with the network printers is in this manner if the printer or printers on the network are capable of communicating using NPAP commands. Otherwise, normal Novell network services which are available running on the host are used to route data for print jobs to printers on the network.

Before communications between the host 41 and NPAP-capable printers on the local area network, the printers must be located and identified. To do this, the Printer Panel and NPAP code 42, utilizing the Network Interface code 43, determines the appropriate resources on the Novell network. The Network Interface code 43 uses calls to conventional Novell network API's (Application Program Interfaces) to obtain this information.

The Network Interface code 43 obtains information about (a) all print queues on the network server that the host is logged onto and (b) the NPAP-capable printers on the server. The Network Interface code 43 then creates identification numbers for all queue/printer pairs and stores a data set for each such queue/printer pair which includes information about the file server, the queue, the type of printer (such as NPAP), the identification number, and a pointer to a location in host memory where further network information related to the print queue is stored.

This information, including the identification numbers for the queue/printer pairs is passed to the Printer Panel and NPAP code 42. After identification numbers for all of the NPAP-capable printer/print queue pairs are established, the Printer Panel and NPAP code 42 can communicate with particular printers on the local area network using NPAP commands and data wrapped in NPAP wrappers.

The Printer Panel and NPAP code 42 attempts bi-directional communication with each potential NPAP printer found on the network. A potential NPAP printer is one having hard-coded model information placing it in a class of potentially NPAP-capable printers. In practice, in the present form of the invention, the attempted bi-directional communication is accomplished by sending a non-printable non-NPAP command to each printer, followed by sending an NPAP command to those potentially NPAP-capable printers which respond to the first command. In practice, various techniques can be employed for determining if NPAP is "on" at a particular printer on the network, such as sending a request for status information and determining if an appropriately-formatted NPAP reply is received.

After establishing the identification of all connected NPAP-capable printers, by communicating in NPAP commands, the Printer Panel and NPAP code 42 requests device characteristics from each NPAP printer. The Printer Panel and NPAP code 42 also sends the appropriate NPAP requests to register for device status alerts and printer configuration changes that the Printer Panel and NPAP code 42 is interested in. interfacing with the user on a display, the Printer Panel and NPAP code 42 provides a list of available printers and displays more detailed information concerning the "active" printer. The active printer is a printer selected by the user or the first printer on the list of printers. The Printer Panel and NPAP code 42 registers for operator panel updates for the active printer in addition to registering for the alerts and configuration changes indicated above. For the active printer the Printer Panel and NPAP code 42 also sends the NPA commands to "read" the printer operator panel's initial state in order to produce a display of the printer operator panel for the user.

Figure 5:
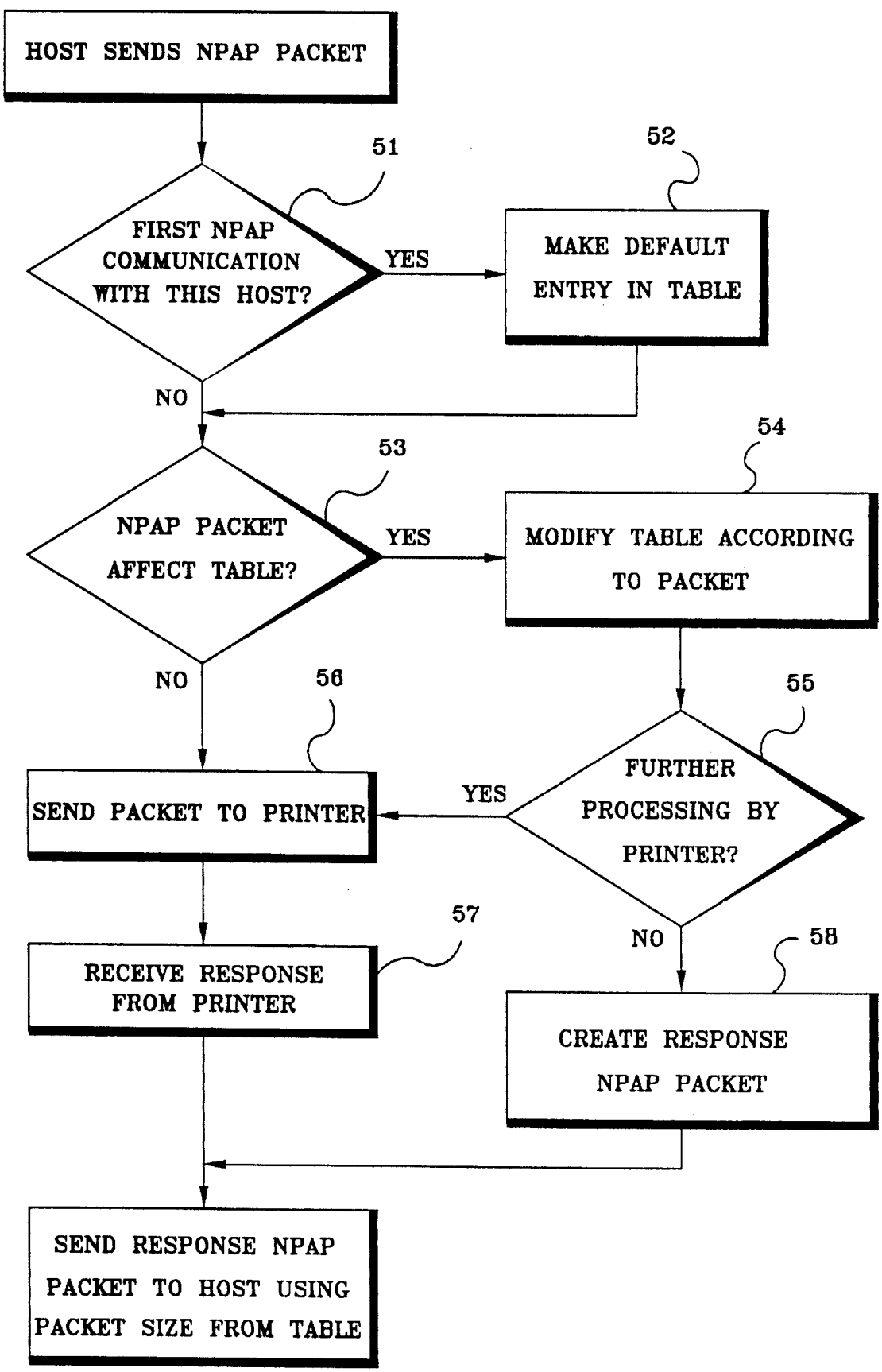
FIG. 5 is a flowchart of the operation of the microprocessor in the internal network adapter of FIG. 2 to implement printer status communication with multiple host computers.

With reference now to FIGS. 2 and 5, after a host computer sends an NPAP packet to the internal network adapter over the network, and it is transferred from the network specific hardware 22 into an appropriate location in the RAM 19, the microprocessor 17 processes the packet by executing instructions in the ROM 18. The microprocessor first determines (51) if this is the first NPAP communication with this host computer. If it is, the processor makes (52) a default entry for this host in a table of host data in the RAM 19. This is the NPAP Information Block 14 shown diagrammatically in FIG. 1.

For each host communicating NPA-compatible data to the network adapter 11, the following information is maintained in a table: (1) which Device Status Alerts are enabled (requested by the host), (2) if operator panel updates with attributes (underscored or blinking characters) are enabled, (3) if operator panel updates without attributes are enabled, (4) a host resettable counter, (5) the maximum host packet size, (6) active configuration changes that have not been read by the host, and (7) power on reset (POR) status that has not been read by the host. Default values placed in the table upon first communication with a host are (1) no device status alerts enabled, (2) no operator panel updates with attributes enabled, (3) no operator panel updates without attributes enabled, (4) host resettable counter set to zero, (5) maximum host packet size set to 64 bytes, (6) active configuration changes set to none, and (7) POR set on.

Each host can subsequently send NPAP commands that change the information in its entry in the NPAP information block 14 (FIG. 1) without affecting any other host's NPAP settings. In this way the adapter 11 keeps track of each individual host's NPAP information, enabling the INA to present an individual virtual NPAP printer to each host on the network.

Once a default entry is made in the table (52), or after it is determined that this is not the first NPAP communication with the particular host (51), the processor next determines if the new NPAP packet will have an effect on the table (53). If the contents of the NPAP packet will have an effect on the table, the table is modified (54) according to the packet. The processor then determines if further processing of the packet by the printer is required (55). If so, or if at the decision point (53) the processor determined that the packet would not affect the table, the packet is then sent to the printer (56). The processor then waits for a response to be received from the printer (57).

If the NPAP packet is one which called for a table modification but did not require further processing by the printer, the processor creates a response NPAP packet (58) to send back to the host. Then, the response from the printer or the response created by the microprocessor is sent as an NPAP packet back to the host using a packet size up to the maximum (such as 64 bytes) from the table.

To illustrate the form of NPAP commands and the manner of their processing in the present system, an example of NPAP communication will be described.

An exemplary NPAP communication between a host computer and a printer on the local area network is the processing of a Device Status Alert (DSA). A DSA is an asynchronous unsolicited message from the printer to one or more hosts to convey a change in status at the printer. Using a DSA, a printer can alert the host(s) to status changes in one of several categories of status information. The categories include Input, Output, Jam, Supplies, Operator Intervention Required, Warnings, Device Service Required and Configuration Change, as set forth in the NPAP Specification. The DSA is contained in the data field of a standard unsolicited NPAP command packet.

An NPAP packet is a structured field, having a start of packet byte, a two byte length field, a flag byte, and a command byte, followed by a sub-command and/or data fields and associated error checking. To facilitate description herein, the error checking bytes which may be placed at the end of a packet will be omitted. The packet structure is then:

| START | LENGTH | FLAG | COMMAND | DATA |
|-------|--------|------|---------|------|
| A5    | XX XX  | XX   | XX      | XX------ |

The entries for the fields are eight bit bytes shown in hexadecimal (hex) notation. So, for example, the "start of packet" byte for an NPAP packet is hex A5 (decimal 165).

Next, the packet length field is a two byte word indicating the number of bytes in the packet, not including the length field itself or the start of packet byte. The NPAP default value for maximum packet size is 64 bytes. Host-to-printer packets are often shorter, usually six to eight bytes long. As an example, a packet length of six bytes would be indicated as 00 06.

In the case of messages from the host to the printer, the purpose of the flag byte is to provide a single byte that the printer can examine to obtain control information. Each bit of the flag byte may be defined so that there is a meaning if the bit is set (logic one) or cleared (logic zero). For present purposes, the bits four and six are of interest (where bit zero is the least significant bit and the bit seven is the most significant bit). The bit six, if set, indicates that the packet contains a message to be processed by the NPAP component of the printer controller. If the bit six is cleared, the packet contains data for a printer interpreter. The bit four, if set, calls for a response from the printer. If, for example, both bits four and six are set (and no other bits are set), the flag byte is hex 50.

In the case of communication from the printer to a host, the purpose of the flag byte is to provide a single byte that the host can look at to obtain control information for the message and a quick view of the printer's status. As in the case of communications from a host to the printer, the flag byte contains individually defined bits. Of present interest, the bit six, if set, indicates that the message is from the NPAP component of the printer controller. The bit four, if set, means that the reply was required by the host (solicited via flag bit four in the message from the host). The bits zero and one are set to the state the printer is in at the time the reply is sent from the printer. The meanings of the conditions of these bits (bit one-bit zero) are: 00—printer is fine with no alert conditions, 01—printer is fine but there is a condition the operator may want to know about (such as a low paper warning), 10—a condition exists which will prevent further printing but the operator can fix it, and 11—a condition exists which will prevent further printing and a service/repair call is required to fix it.

Returning to the format of a host-to-printer NPAP packet, the fifth byte is a command byte, whose meaning is dependent upon the state of bit six in the flag byte. If flag bit six is set, the command byte contains a command for the NPAP component of the printer controller. If flag bit six is cleared, the command byte contains a printer controller interpreter designation.

For a printer-to-host reply message, the original command or interpreter identification of the host-to-printer message that caused the reply is returned. If the message from the printer is unsolicited (flag bit four cleared and flag bit six set)

and the command byte is FX, then the packet represents an alert of type FX. For example, a Device Status Alert (DSA) is indicated by a command byte of FF.

For packets from a host, the data bytes following the command byte have a meaning dependent upon flag bit six. If flag bit six is set, the data field contains either data or a command modifier, dependant on the command, for the NPAP component of the printer controller. If flag bit six is cleared, the data field contains data for the input queue of a printer controller interpreter.

For packets from the printer, when flag bit six is set, the data field contains Alert data for an FX command byte or the packet contains error information or the data field contains a command response as called for by the command returned in the command byte (flag bit four set). When flag bit six is cleared, the data field contains a message from a Logical Unit (such as an interpreter), and byte five contains the Logical Unit identification.

Returning to the processing of a Device Status Alert (DSA), when there is a printer status change calling for the production of a DSA communicated from the Printer State Task 38 (FIG. 3) to the NPAP Task 31, the Alert is sent by the NPAP Task in the printer controller in the following (hex) form: A5|00 05|XX|FF|XX XX XX. For the flag byte, if the printer is all right, but there is a condition the operator may want to know about (bit zero set and bit one cleared), and additionally only the bit six is set, the flag byte value is hex 41. In this case the Alert is in the form: A5|00 05|41|FF|XX XX XX. The first of the three data bytes is defined so that its bit zero is set for power-on initialization, its bit six is set for a printer off-line indication, and its bit seven is set if the printer is busy and unable to accept data. The second and third data bytes are used to designate the various types of Alerts. For example, a Warning Alert calls for the third data byte to be hex 02. If the Warning Alert were the only Alert condition in the DSA, the packet would then take the form: A5|00 05|41|FF00 00 02.

To send the Warning Alert to the INA 11, the NPAP Task in the printer controller communicates through the Port Bios Task 33 and the printer port 24 (FIG. 2) to request that the DMA ASIC 23 set the printer port to DSA mode. When this is done, the Warning Alert is transferred to the RAM 19 in the INA 11. The INA microprocessor 17 checks the tables for the host computers stored in the NPAP information block to determine which host computers have requested to be notified of Warning Alerts. The Warning Alert is then sent over the network to all of the appropriate host computers.

At a host computer receiving the Warning Alert, the Printer Panel and NPAP code 42 (FIG. 4) determines if further information on the nature of the warning is desired. This determination may be affected by the current active printer selection, for example, or a selection by the user.

If at a particular host further information about the nature of the Warning Alert is desired, the Printer Panel and NPAP code sends a Request Device Status command with a Request Warnings sub-command to the INA 11. This command packet would generally be in the form A5|00 03|50|04|07, where the command byte 04 is the Request Device Status command and the data byte 07 is the Request Warnings sub-command.

When the Warnings request is received by the INA 11, it is processed in accordance with the steps in the flow chart of FIG. 5. The flow is from the step 51 to the step 53 to the step 56, sending the Warnings request to the printer controller. In the printer controller (FIG. 3), the NPAP Task 31 obtains the requested information from the Printer State Task 38. This information is used to formulate a Printer Response packet.

This Printer Response packet for a single warning would usually take the form A5|XX XX|50|04|07 01|XX XX XX XX XX -----. The printer returns the same command (04) and sub-command (07) that was received from the host and provides, after the sub-command, the number of warning messages to follow (in this case one as indicated by the hex 01). For an "output bin nearly full" warning, for example, the Printer Response packet is in the form A5|XX XX|04|07 01 02 FF 04 XX XX ---. In the data field, after the "07 01", the 02 designates an "output" location for the warning, the FF that no output ID is specified, and the 04 that the warning is "output bin nearly full". The trailing bytes (after the 04) are an ASCII-coded message that can be displayed at the host (preceded by a byte indicating the length of the ASCII message).

The Printer Response NPAP packet (indicating that the output bin is nearly full) is sent by the printer controller to the INA, which sends the packet to the host which sent the Request Device Status command with the Request Warnings sub-command. In this way any host computer desiring detailed device status information can receive and store the information for use by that host computer without requiring that the detailed information be stored in an intermediate location such as the INA memory.

The selection by a host computer of Alerts that the host wishes to be notified about is accomplished by the host sending a Printer Configuration Control (PCC) command with a Select Device Status Alerts sub-command to the INA. This results in a table modification with regard to that host, as shown in step 54 of the flow chart of FIG. 5. The PCC command would (for selecting Warnings) take the form A5|00 06|50|03|03 00 00 02, where the 03 command byte designates a PCC command, and the 03 data byte designates the Select Device Status Alerts sub-command. The remaining data bytes 00 00 02 designate the selection for notification of only Warning Alerts.

The latest version of the NPAP specification is published and generally available. For example, copies are presently available via anonymous FTP from ftp.lexmark.com [192.146.101.4]. The NPAP Specification Level 1, Revision N, Feb. 11, 1994, is incorporated herein by reference. Vendors may define and implement their own unique commands, or "extensions", to the NPAP. For example, the earlier-described "push front panel button" and "remote printer operator panel" functions are implemented using extensions defined by the assignee of the present application. These extension commands are set forth in the following tables, which generally describe the host-to-printer command format followed by the printer response command format for each command and sub-command.

| \multicolumn{3}{c}{E0 E0 Push Front Panel Button} |
| --- | --- | --- |
| Byte | Value | Description (Host to Printer) |
| 1 | A5 | Start of Packet Byte |
| 2 | 00 06 | Length in Bytes (Does not include these 2 bytes nor the SOP) |
| 1 | Bit Encoded Byte | Flag |
| 1 | E0 | Command, Lexmark Extensions |
| 1 | E0 | Subcommand, Push Front Panel Button |
| 2 | Unsigned Word | printer assigned in the response to the Enable Front Panel Button Control command (E0 E1 01). |
| 1 | Bit Encoded Byte | Button to be pushed. |
| Byte | Value | Description (Printer Response) |
| 1 | A5 | Start of Packet Byte |

E0 E0 Push Front Panel Button

| | | |
|---|---|---|
| 2 | 00 05 | Length in Bytes (Does not include these 2 bytes nor the SOP) |
| 1 | Bit Encoded Byte | Flag |
| 1 | E0 | Command, Lexmark Extensions |
| 1 | E0 | Subcommand, Push Front Panel Button |
| 2 | Unsigned Word | printer assigned in the response to the Enable Front Panel Button Control command (E0 E1 01). |

The button bit mask defined below:
Bit 0 not used
Bit 1 Button 1 on printer panel (top right)
Bit 2 Button 2 on printer panel (next down)
Bit 3 Button 3 on printer panel (next down)
Bit 4 Button 4 on printer panel (next down)
Bit 5 Button 5 on printer panel (Return)
Bit 6 Button 6 on printer panel (Ready)
Bit 7 not used Bit set to 1=button make and break.

Multiple button combinations are not supported at this time.

Note: The request will be denied if another host has control. The request must be retried at a later time.

SPECIAL CASE: This command will be performed if both id bytes equal 0 and Remote Button Control mode is inactive.

Front Panel Control/Monitor

Front panel data comes back in the same format, string contents of the front panel followed by the attribute data is the attribute data was requested and is available. Attribute data availability and meaning will depend on the product. The number of bytes supplied for both the panel string and the attribute data can be determined by the size of the panel as reported in E0 E1 06 command. Printers which support versions 2 or less are assumed to have 4 by 20 panels as described below.

All responses that include panel data look basically the same. They all use the command sequence E0 E1. None of these responses indicate how they were requested; the 02, 03, 04 or 05 is not echoed in the command and the presence or absence of the asttribute data is not indicated.

Notes For 4 by 20 Displays:

The panel message data String (80 bytes) begins with the ASCII character at Row 1, Column 1 continuing through Row 4, Col 20.

The panel attribute data (80 bytes) follows the panel message data in the response. The attribute data would be the logical OR of the following bit masks, 0×80=blink, 0×10=underline, 0×00=normal.

E0 E1 00 Disable Remote Front Panel Button Control

| Byte | Value | Description (Host to Printer) |
|---|---|---|
| 1 | A5 | Start of Packet Byte |
| 2 | 00 06 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| 1 | 00 | Disable Remote Front Panel Button Control |
| 2 | Unsigned Word | printer assigned in the response to the Enable Front Panel Button Control command (E0 E1 01). |

| Byte | Value | Description (Printer Response) |
|---|---|---|
| 1 | A5 | Start of Packet Byte |
| 2 | 00 06 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| 1 | 00 | Disable Remote Front Panel Button Control |
| 2 | Unsigned Word | printer assigned in the response to the Enable Front Panel Button Control command (E0 E1 01). |

Note: The request will be denied if another host has control. The request must be retried at a later time.

E0 E1 01 Enable Remote Front Panel Button Control

| Byte | Value | Description (Host to Printer) |
|---|---|---|
| 1 | A5 | Start of Packet Byte |
| 2 | 00 04 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| 1 | 01 | Enable Remote Front Panel Button Control |

| Byte | Value | Description (Printer Response) |
|---|---|---|
| 1 | A5 | Start of Packet Byte |
| 2 | 00 06 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| 1 | 01 | Enable Remote Front Panel Button Control |
| 2 | Unsigned Word | Printer assigned ID. |

Note: The request will be denied if another host has control. The request must be retried at a later time.
Note: The id bytes issued in the response to this command must by used in the Disable (E0 E1 00) command, and also the Push Button (E0 E0) command.

E0 E1 02 Return Front Panel Messages and Attributes

| Byte | Value | Description (Host to Printer) |
|---|---|---|
| 1 | A5 | Start of Packet Byte |
| 2 | 00 04 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| 1 | 02 | Return Front Panel Messages and Attributes |

| Byte | Value | Description (Printer Response) |
|---|---|---|
| 1 | A5 | Start of Packet Byte |
| 2 | 00 06 | Length in Bytes (Does not include these 2 bytes nor the SOP) |

-continued

E0 E1 02 Return Front Panel Messages and Attributes

| | | |
|---|---|---|
| 1 | Bit Encoded Byte | Flag |
| 1 | E0 | Command, Lexmark Extensions |
| 1 | E1 | Subcommand, Front Panel Control/Monitor |
| n | ASCII | Panel Message String |
| n | Binary | Attribute data(If available) |

E0 E1 03 Enable/Disable Front Panel Change Alert(Attribute Data)

| Byte | Value | Description (Host to Printer) |
|---|---|---|
| 1 | A5 | Start of Packet Byte |
| 2 | 00 05 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| 1 | 03 | Enable/Disable Front Panel Change Alert |
| 1 | 00 | Disable Front Panel Change Alert |
| | 01 | Enable Front Panel Change Alert |

| Byte | Value | Description (Printer Response) |
|---|---|---|
| 1 | A5 | Start of Packet Byte |
| 2 | 00 06 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| n | ASCII | Panel Message String |

E0 E1 05 Enable/Disable Front Panel Change Alert (no Attribute data)

| Byte | Value | Description (Host to Printer) |
|---|---|---|
| 1 | A5 | Start of Packet Byte |
| 2 | 00 05 | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| 1 | 05 | Enable/Disable Front Panel Change Alert |
| 1 | 00 | Disable Front Panel Change Alert |
| | 01 | Enable Front Panel Change Alert |

| Byte | Value | Description (Printer Response, Possitive Response) |
|---|---|---|
| 1 | A5 | Start of Packet Byte |
| 2 | Unsigned Word | Length in Bytes (Does not include these 2 bytes nor the SOP) |
| 1 | Bit Encoded Byte | Flag |
| 1 | E0 | Command, Lexmark Extensions |
| 1 | E1 | Subcommand, Front Panel Control/Monitor |
| n | ASCII | Panel Message String |

| Byte | Value | Description (Host to Printer, Negavite Response) |
|---|---|---|
| 1 | A5 | Start of Packet Byte |
| 2 | 00 05 | Length in Bytes (Does not include these 2 bytes nor the SOP) |
| 1 | Bit Encoded Byte | Flag |

E0 E1 05 Enable/Disable Front Panel Change Alert (no Attribute data)

| | | |
|---|---|---|
| 1 | E0 | Command, Lexmark Extensions |
| 1 | E1 | Subcommand, Front Panel Control/Monitor |
| 1 | 05 | Enable/Disable Front Panel Change Alert(No Attribute Data) |
| 1 | 00 | Disable Alert |

F0 E1 Front Panel Change Alert

| Byte | Value | Description |
|---|---|---|
| 1 | A5 | Start of Packet Byte |
| 2 | Unsigned Word | Length in Bytes (Does not include these 2 bytes nor the SOP) |
| 1 | Bit Encoded Byte | Flag |
| 1 | F0 | Command, Lexmark Extensions |
| 1 | E1 | Subcommand, Front Panel Change Alert |
| 80 | ASCII | Panel message data string |
| 80 | ASCII | Panel attribute data. This is returned only if the host requested this information when it registered for the alert |

Notes:
- The panel message data string (80 bytes) begins with the ASCII character at Row 1, Column 1 continuing through Row 4, Col 20.
- The panel attribute data (80 bytes) follows the panel message data in the response. The attribute data would be the logical OR of the following bit masks, $0 \times 80$ = blink, $0 \times 10$ =underline, $0 \times 00$ = normal.

What is claimed is:

1. An interface between a network of host computers and a printer controller for a printer comprising:

means for communicating with the printer controller to receive printer status information of different types;

means for storing a set of data for each host computer of a number of the host computers on the network, each set of data including designations corresponding to at least some of said types of printer status information to be communicated to a corresponding host computer of the number of host computers; and means for communicating with the number of host computers to send at least some of said plurality of plurality of types of said printer status information to said number of host computers, wherein the types of said printer status information sent to a particular host computer correspond to the stored designations of types of said printer status information in the set of data stored for said particular host computer.

2. The interface of claim 1 in which the printer status information comprises printer status alerts and further comprising:

means for communicating with a host computer of the number of host computers for which sets of data are stored, after sending a printer status alert to said host computer, to receive a request for detailed printer status information from said host computer;

means for communicating with the printer controller to receive the detailed printer status information requested by said host computer; and means for communicating with said host computer to send the requested detailed printer status information to said host computer.

3. A system comprising the printer having the printer controller and the interface of claim 1 in which the set of data stored for each host computer further includes (a)

information supplied by the host computer governing communication with the host computer and (b) information supplied by the printer controller concerning printing performed by the printer.

4. The interface of claim 1, wherein said designations for said particular host computer stored in said interface are changeable by said particular host computer.

5. The interface of claim 1, wherein default values for said designations in a first set of data are stored in said means for storing upon initial communications with a first host computer of the number of host computers, and wherein said designations in said first set of data are thereafter subject to change by said first host computer.

6. An interface between a network of host computers and a printer controller for a printer, comprising:

means for communicating with said printer controller to receive a plurality of types of printer status information;

means for storing data including designations corresponding to particular types of said plurality of types of printer status information to be communicated to each of a number of said host computers; and means for communicating with said number of said host computers to send at least some of said plurality of types of said printer status information to said number of said host computers, wherein the types of said printer status information sent to a particular one of said number of said host computers correspond to the stored designations of types of printer status information associated with said particular one of said number of said host computers, and wherein said designations associated with said particular one of said number of said host computers are subject to change by said particular one of said number of said host computers.

7. A network adapter interface to permit communications between a printer and a network of host computers without connection of said printer to a printer server, comprising:

means for communicating with said printer to receive a plurality of types of printer status information therefrom;

means for storing data including designations corresponding to particular types of said plurality of types of printer status information to be communicated to each of a number of said host computers; and means for communicating with said number of host computers to send at least some of said plurality of types of said printer status information to said number of host computers, wherein the types of said printer status information sent to a first host computer of said number of host computers correspond to the stored designations of types of printer status information to be communicated to said first host computer.

* * * * *